(12) United States Patent
Tani et al.

(10) Patent No.: US 8,271,580 B2
(45) Date of Patent: Sep. 18, 2012

(54) MOBILE COMMUNICATION NETWORK SYSTEM AND SERVER APPARATUS

(75) Inventors: Sohei Tani, Koganei (JP); Tomonori Nakamura, Yokohama (JP); Hisashi Hamada, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 18 days.

(21) Appl. No.: 12/519,643

(22) PCT Filed: Dec. 12, 2007

(86) PCT No.: PCT/JP2007/073967
§ 371 (c)(1),
(2), (4) Date: Feb. 25, 2010

(87) PCT Pub. No.: WO2008/075600
PCT Pub. Date: Jun. 26, 2008

(65) Prior Publication Data
US 2011/0119323 A1    May 19, 2011

(30) Foreign Application Priority Data
Dec. 19, 2006    (JP) ................................ 2006-341360

(51) Int. Cl.
*G06F 15/16* (2006.01)
(52) U.S. Cl. ........ 709/203; 709/218; 709/230; 713/176; 719/313; 455/418
(58) Field of Classification Search .................. 709/203, 709/230, 218; 713/176
See application file for complete search history.

(56) References Cited

U.S. PATENT DOCUMENTS

| | | | | |
|---|---|---|---|---|
| 6,804,778 | B1 * | 10/2004 | Levi et al. | 713/176 |
| 2004/0255005 | A1 * | 12/2004 | Spooner | 709/218 |
| 2005/0044270 | A1 | 2/2005 | Grove et al. | |
| 2007/0226750 | A1 * | 9/2007 | Sharp et al. | 719/313 |
| 2008/0113659 | A1 * | 5/2008 | Venkateswaran et al. | 455/418 |

FOREIGN PATENT DOCUMENTS

| | | |
|---|---|---|
| JP | 2001125821 | 5/2001 |
| JP | 2003522358 | 7/2003 |
| JP | 2004530231 A | 9/2004 |
| JP | 2005521120 | 7/2005 |

OTHER PUBLICATIONS

Yasutaka Otake et al., "SIP o Mochiita Onsei Tsuwa ni Taisuru NAT Tsuka Shuho no Teian to sono Jisso," Transactions of Information Processing Society of Japan, Mar. 15, 2004, vol. 45, pp. 813-823.
Hiroshi Fujisawa et al., "Fukusu no Mirror Server eno Koritsuteki na Access Kiko no Jitsugen," Information Processing Society of Japan Kenkyu Hokoku, Jan. 30, 2004, 99 37-42.
Decision of Final Rejection issued for corresponding JP patent application No. 2006-341360.
PC Japan, JP Softbank Creative Corp., Nov. 1, 2006, vol. 11, No. 11.

* cited by examiner

*Primary Examiner* — Kyung H Shin
(74) *Attorney, Agent, or Firm* — Michaud-Kinney Group LLP (57) ABSTRACT

A mobile communication network system and server apparatus enabling the time for a mobile terminal apparatus to acquire content to be sufficiently reduced. In a mobile communication network system provided with a cellular telephone 10 having the browser function, and a mobile communication center 11 that manages mobile communication in the cellular telephone 10 via a mobile communication network 13, upon receiving a request for Web access from the cellular telephone 10, the mobile communication center 11 determines whether the request meets a predetermined condition, and when the request meets the predetermined condition, executes pipeline processing for enabling HTTP requests from the cellular telephone 10 to be continuously received.

22 Claims, 5 Drawing Sheets

MOBILE COMMUNICATION NETWORK SYSTEM AND SERVER APPARATUS

FIELD OF THE INVENTION

The present invention relates to a mobile communication network system and server apparatus, and more particularly, to a mobile communication network system having mobile terminal apparatuses provided with a Web browser function (hereinafter, simply referred to as "browser function") and a server apparatus for managing the mobile communication of the mobile terminal apparatuses.

BACKGROUND

Conventionally, cellular telephones have become widespread which include a browser function enables Web sites on the Internet to be browsed using the cellular telephone. Currently, among these cellular telephones, such telephones have become popular that have the browser function capable of browsing principally Web sites created for cellular telephones. In recent years, cellular telephones have begun to spread widely which have the browser function (so-called full-browser function) capable of browsing Web sites created for personal computers, as well as Web sites for cellular telephones.

Generally, in the browser function of the cellular telephone, communications are performed with a content server on the Internet according to the HTTP protocol via a mobile communication center having the gateway function to obtain content (hereinafter, simply referred to as "content") to display a Web site. In the HTTP protocol, ordinarily, the content can be obtained by repeating a request transmitted to the content server from a cellular telephone that is a client and a response replied to the cellular telephone from the content server in response to the request. The request transmitted from the cellular telephone is issued after receiving a response to the last transmitted request, and thus, is easy to undergo the effect of congestion status of the communication channel. Therefore, when the request and response are repeated under circumstances where the communication channel is congested, there are cases where considerable time is required to acquire the content.

Meanwhile, in HTTP/1.1 (RFC2616) that is the Internet standard, it is determined that requests transmitted from a client are pipelined (request pipeline). This request pipeline is a technique of continuously transmitting a plurality of requests without waiting for respective responses. By using this request pipeline, instead of waiting to transmit the next request until a response to the last request has been returned, it is possible to continuously transmit requests without waiting for the responses, and it is thereby possible to reduce the time required to transmit the requests, and shorten the time taken to acquire the content.

To execute the request pipeline, the content server needs to support HTTP/1.1. When the content server does not support HTTP/1.1, the request and response are repeated as described above. Then, an improved data communication method has conventionally been proposed to enable communications between a user apparatus and server apparatus to be performed according to the HTTP protocol even in such a case that the content server does not support HTTP/1.1 In one data communication method, a proxy server converts the version of the HTTP protocol when the content server does not support HTTP/1.1, and HTTP protocol communications are thereby guaranteed between the user apparatus and content server.

SUMMARY OF THE INVENTION

However, in the above-mentioned conventional data communication method, when the content server does not support HTTP/1.1, the proxy server needs to convert the version of the HTTP protocol whenever a request or response arrives, and the problem arises that the time taken to obtain content cannot be sufficiently reduced due to the time required for the conversion processing.

The present invention was carried out in view of the aforementioned problem, and it is an object of the invention to provide a mobile communication network system and server apparatus enabling the time for a mobile terminal apparatus to acquire content to be sufficiently reduced.

A mobile communication network system of the invention is provided with a mobile terminal apparatus having the browser function, and a server apparatus that manages mobile communication in the mobile terminal apparatus via a mobile communication network, and is characterized in that upon receiving a request for Web access from the mobile terminal apparatus, the server apparatus determines whether the request meets a predetermined condition, and when the request meets the predetermined condition, executes pipeline processing for enabling HTTP requests from the mobile terminal apparatus to be continuously received.

Accordingly, when a request received from the mobile terminal apparatus meets a predetermined condition, since the server apparatus executes the pipeline processing for enabling HTTP requests from the mobile terminal apparatus to be continuously received, such matters are prevented that the communication time undergoes the effect of communication status on the mobile communication network and increases as a result of repeating the request and response on the mobile communication network, and it is thereby possible to adequately reduce the time for the mobile terminal apparatus to acquire the content.

In the mobile communication network system, it is considered that the server apparatus determines execution of the pipeline processing corresponding to UA, HTTP version and details of the method of the request. For example, it is preferable to execute the pipeline processing in the case of UA of the request being a terminal supporting the pipeline processing with the access from a predetermined browser, the HTTP version being HTTP/1.1, and a predetermined method. As a predetermined browser, for example, considered is the case of access from a full-browser or a browser for mobile terminal apparatuses. As a predetermined method, for example, considered is the case of GET or HEAD, or the case of GET, HEAD or POST. In this case, since execution of the pipeline processing is determined corresponding to UA of the request from the mobile terminal apparatus, HTTP version and details of the method, it is possible to execute the pipeline processing on the mobile communication network only in the required case.

Further, in the mobile communication network system, a content distribution apparatus may be further provided to distribute content to the mobile terminal apparatus via the server apparatus, where the server apparatus sequentially transmits HTTP requests continuously received by the pipeline processing to the content distribution apparatus, while receiving HTTP responses to the HTTP requests from the content distribution apparatus. In this case, also when the content distribution apparatus distributes the content to the mobile terminal apparatus via the server apparatus, such matters are prevented that the communication time undergoes the effect of communication status on the mobile communication network and increases as a result of repeating the request and response on the mobile communication network, and it is thereby possible to adequately reduce the time for the mobile terminal apparatus to acquire the content.

Particularly, even in the case where the content distribution apparatus does not support HTTP/1.1 and is not able to execute the request pipeline, by the pipeline processing on the mobile communication network, such matters are prevented that the communication time undergoes the effect of communication status on the mobile communication network and increases as a result of repeating the request and response on the mobile communication network, and it is thereby possible to sufficiently reduce the time for the mobile terminal apparatus to acquire the content. Further, in the server apparatus, since it is not necessary to convert the version of HTTP protocol unlike the conventional improved data communication method, such matters do not occur either that the time elapsed before acquiring the content is increased corresponding to the time required for the protocol conversion processing.

Further, in the mobile communication network system, it is preferable that the server apparatus abandons the HTTP request from the mobile terminal apparatus or HTTP response from the content distribution apparatus as required when the server apparatus detects unauthorized Content-length in the HTTP response from the content distribution apparatus. In this case, even in the case of detecting unauthorized Content-length in the HTTP response, since the HTTP request from the mobile terminal apparatus or HTTP response from the content distribution apparatus is abandoned as required to continue the pipeline processing, it is possible to reduce the time for the mobile terminal apparatus to acquire the content, while preventing matters that communications between the mobile terminal apparatus and the content distribution apparatus are disconnected in response to unauthorized Content-length.

For example, in the mobile communication network system, when a Content-length value in the HTTP response from the content distribution apparatus is greater than data actually transmitted from the content distribution apparatus, the server apparatus abandons the HTTP request from the mobile terminal apparatus as necessary. In this case, since the HTTP request from the mobile terminal apparatus is abandoned as necessary when a Content-length value is greater than data actually transmitted from the content distribution apparatus, it is possible to prevent matters that subsequent pipeline processing is limited due to the HTTP request remaining.

Further, in the mobile communication network system, when a Content-length value in the HTTP response from the content distribution apparatus is smaller than data actually transmitted from the content distribution apparatus, the server apparatus abandons the HTTP response from the content distribution apparatus as necessary. In this case, since the HTTP response from the content distribution apparatus is abandoned as necessary when a Content-length value is smaller than data actually transmitted from the content distribution apparatus, it is possible to prevent matters that subsequent pipeline processing is limited due to the HTTP response remaining.

Furthermore, in the mobile communication network system, when a Content-length header is not present in the HTTP response from the content distribution apparatus, the server apparatus abandons the HTTP request from the mobile terminal apparatus as required. In this case, since the HTTP request from the mobile terminal apparatus is abandoned as necessary when a Content-length header is not present in the HTTP response, it is possible to prevent matters that subsequent pipeline processing is limited due to the HTTP request remaining.

Still furthermore, in the mobile communication network system, it is preferable that the server apparatus rewrites descriptions of a connection header to Keep-Alive to continue the pipeline processing when the connection header of the HTTP response from the content distribution apparatus is given close. In this case, even when a connection header in the HTTP response is given close, since descriptions of the connection header are rewritten to Keep-Alive to continue the pipeline processing, it is possible to reduce the time for the mobile terminal apparatus to acquire the content, while preventing matters that communications between the mobile terminal apparatus and the content distribution apparatus are disconnected according to close attached to the connection header.

A server apparatus of the invention is a server apparatus that manages mobile communication in a mobile terminal apparatus via a mobile communication network, and is characterized by having a request receiving section that receives a request from the mobile terminal apparatus, a pipeline determining section which determines whether the request received in the request receiving section meets a predetermined condition, and when the request meets the predetermined condition, allows execution of pipeline processing for enabling HTTP requests from the mobile terminal apparatus to be continuously received, a request holding section that holds HTTP requests continuously received from the mobile terminal apparatus in the pipeline processing, and a response transmitting section that transmits a response to the mobile terminal apparatus.

According to this configuration, the pipeline determining section determines whether the request received from the mobile terminal apparatus meets a predetermined condition, and when the request meets the predetermined condition, the pipeline processing is executed which enables HTTP requests from the mobile terminal apparatus to be continuously received. Therefore, when the request from the mobile terminal apparatus meets the predetermined condition, such matters are prevented that the communication time undergoes the effect of communication status on the mobile communication network and increases as a result of repeating the request and response on the mobile communication network, and it is thereby possible to adequately reduce the time for the mobile terminal apparatus to acquire the content.

In the server apparatus, it is considered that the pipeline determining section allows the pipeline processing to be executed corresponding to UA, HTTP version and details of the method of the request. For example, it is preferable to allow the pipeline processing to be executed in the case of UA of the request being a terminal supporting the pipeline processing with the access from a predetermined browser, the HTTP version being HTTP/1.1, and a predetermined method. As a predetermined browser, for example, considered is the case of access from a full-browser or a browser for mobile terminal apparatuses. As a predetermined method, for example, considered is the case of GET or HEAD, or the case of GET, HEAD or POST. In this case, since the pipeline processing is executed corresponding to UA of the request from the mobile terminal apparatus, HTTP version and details of the method, it is possible to execute the pipeline processing on the mobile communication network only in the required case.

Further, in the server apparatus, it is preferable that the server apparatus has a request transmitting section that transmits a request from the mobile terminal apparatus to the content distribution apparatus, a response receiving section that receives a response from the content distribution apparatus, and a Content-length determining section that determines an unauthorized Content-length in the HTTP response received in the response receiving section, where the Content-length determining section abandons the HTTP request from the mobile terminal apparatus or HTTP response from the content distribution apparatus as required to continue the pipeline processing when the Content-length determining section detects unauthorized Content-length. In this case, even in the case of detecting unauthorized Content-length in the HTTP response, since the HTTP request from the mobile terminal apparatus or HTTP response from the content distribution apparatus is abandoned as required to continue the pipeline processing, it is possible to reduce the time for the mobile terminal apparatus to acquire the content, while preventing matters that communications between the mobile terminal apparatus and the content distribution apparatus are disconnected in response to unauthorized Content-length.

For example, in the server apparatus, when a Content-length value in the HTTP response from the content distribution apparatus is greater than data actually transmitted from the content distribution apparatus, the Content-length determining section abandons the HTTP request from the mobile terminal apparatus as necessary. In this case, since the HTTP request from the mobile terminal apparatus is abandoned as necessary when a Content-length value is greater than data actually transmitted from the content distribution apparatus, it is possible to prevent matters that subsequent pipeline processing is limited due to the HTTP request remaining.

Further, in the server apparatus, when a Content-length value in the HTTP response from the content distribution apparatus is smaller than data actually transmitted from the content distribution apparatus, the Content-length determining section abandons the HTTP response from the content distribution apparatus as necessary. In this case, since the HTTP response from the content distribution apparatus is abandoned as necessary when a Content-length value is smaller than data actually transmitted from the content distribution apparatus, it is possible to prevent matters that subsequent pipeline processing is limited due to the HTTP response remaining.

Furthermore, in the server apparatus, when a Content-length header is not present in the HTTP response from the content distribution apparatus, the Content-length determining section abandons the HTTP request from the mobile terminal apparatus as required. In this case, since the HTTP request from the mobile terminal apparatus is abandoned as necessary when a Content-length header is not present in the HTTP response, it is possible to prevent matters that subsequent pipeline processing is limited due to the HTTP request remaining.

Still furthermore, in the server apparatus, it is preferable that the server apparatus has a connection header determining section that determines a connection header of Content-length in the HTTP response received in the response receiving section, and that the connection header determining section rewrites descriptions of a connection header to Keep-Alive to continue the pipeline processing when the connection header of the HTTP response is given close. In this case, even when a connection header in the HTTP response is given close, since descriptions of the connection header are rewritten to Keep-Alive to continue the pipeline processing, it is possible to reduce the time for the mobile terminal apparatus to acquire the content, while preventing matters that communications between the mobile terminal apparatus and the content distribution apparatus are disconnected according to close attached to the connection header.

According to the mobile communication network system and server apparatus according to the invention, when a request received from the mobile terminal apparatus meets a predetermined condition, since the pipeline processing is executed which enables HTTP requests from the mobile terminal apparatus to be continuously received, such matters are prevented that the communication time undergoes the effect of communication status on the mobile communication network and increases as a result of repeating the request and response on the mobile communication network, and it is thereby possible to adequately reduce the time for the mobile terminal apparatus to acquire the content.

DETAILED DESCRIPTION OF THE PREFERRED EMBODIMENTS

An embodiment of the present invention will specifically be described below with reference to accompanying drawings.

Figure 1:
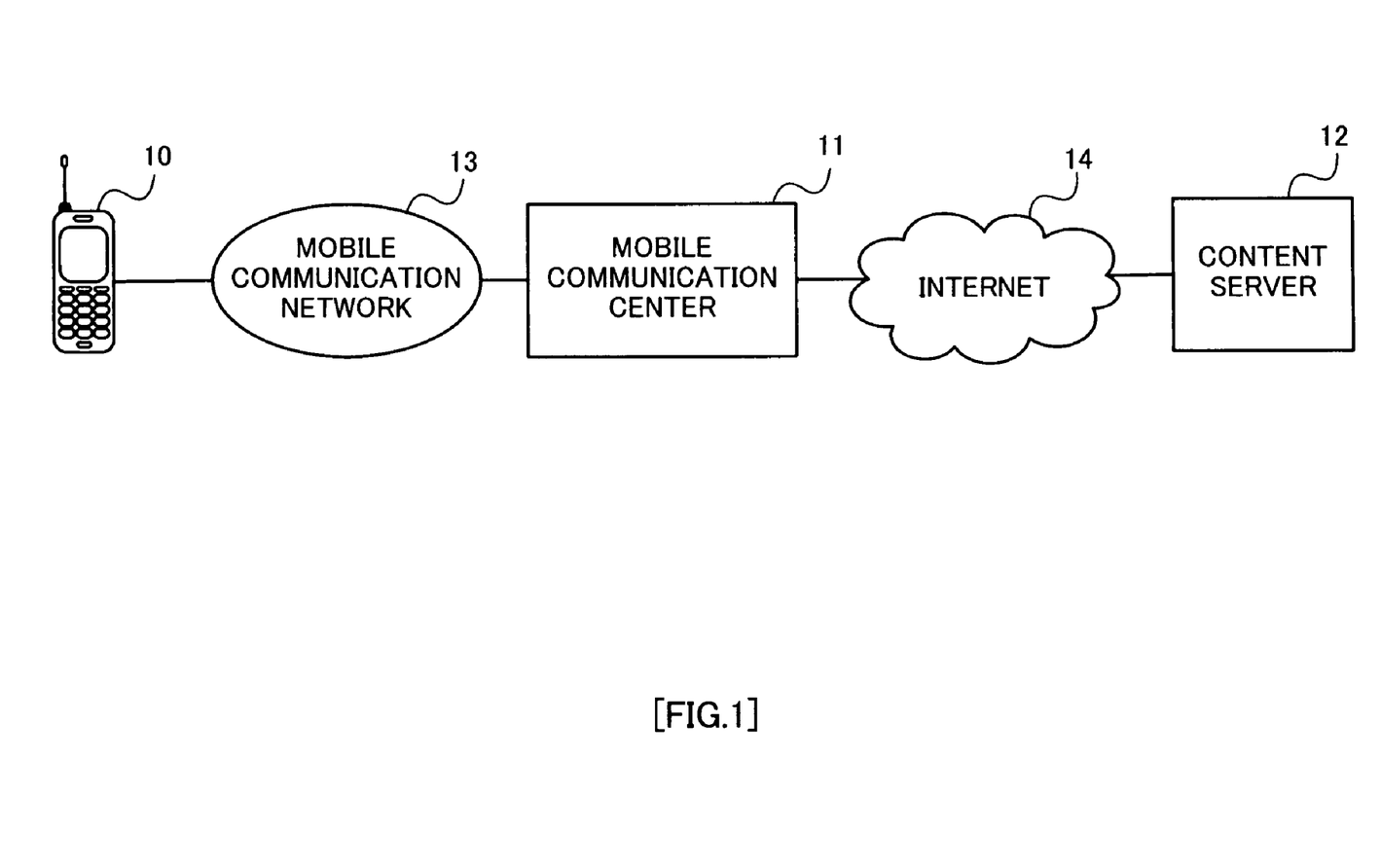
FIG. 1 is a diagram illustrating a configuration of a mobile communication network system according to an embodiment of the invention.

FIG. 1 is a diagram illustrating a configuration of a mobile communication network system according to an embodiment of the invention. As shown in FIG. 1, the mobile communication network system according to this embodiment has a cellular telephone 10 as a mobile communication terminal apparatus, a mobile communication center 11 as a server apparatus for managing mobile communication in the cellular telephone 10, and a content server 12 as a content distribution apparatus for distributing contents to clients including the cellular telephone 10.

The cellular telephone 10 is configured to be able to access the content server 12 via a mobile communication network 13 formed of a communication network such as IMT (International Mobile Telecommunication) and the like, and another communication network such as the Internet 14 and the like. Then, the cellular telephone 10 is capable of browsing contents distributed from the content server 12 via such communication networks as described later. Particularly, the cellular telephone 10 is configured to support HTTP/1.1, and be able to continuously transmit a plurality of HTTP requests (hereafter, simply referred to as "requests") without waiting for reception of respective responses (request pipeline). In the following, the cellular telephone supporting HTTP/1.1 is referred to as a "pipeline-compliant terminal" as appropriate. In addition, FIG. 1 shows the case that the mobile communication network 13 is formed of the IMT network, but the invention is not limited thereto, and the network 13 may be formed of another network other than the IMT network.

The mobile communication center 11 is connected to the content server 12 via the Internet 14, and has the function capable of performing communication according to the HTTP protocol between the mobile communication network 13 and the Internet 14. Particularly, the mobile communication center 11 according to this embodiment determines whether the cellular telephone 10 is a pipeline-compliant terminal, and when the telephone 10 is a pipeline-compliant terminal, shifts to a mode (hereinafter, referred to as a "pipeline mode" as appropriate) for enabling requests from the cellular telephone 10 to be continuously received.

The content server 12 distributes contents to clients accessing through the Internet 14. When the cellular telephone 10 accesses as a client, the content server 12 distributes content to the mobile communication center 11 via the Internet 14, and the content is distributed to the cellular telephone 10 via the mobile communication center 11. Herein, the content server 12 is assumed to distribute contents to display Web sites created for personal computers. Further, the content server 12 supports HTTP/1.0, and as distinct from the cellular telephone 10, does not support the request pipeline.

In the mobile communication network system according to this embodiment having such a constitution, even when the content server 12 does not support HTTP/1.1, requests on the mobile communication network 13 are pipelined. More specifically, the mobile communication center 11 determines whether the cellular telephone 10 is a pipeline-compliant terminal, and when the telephone 10 is a pipeline-compliant terminal, allows requests from the cellular telephone 10 to be continuously received.

Figure 2:
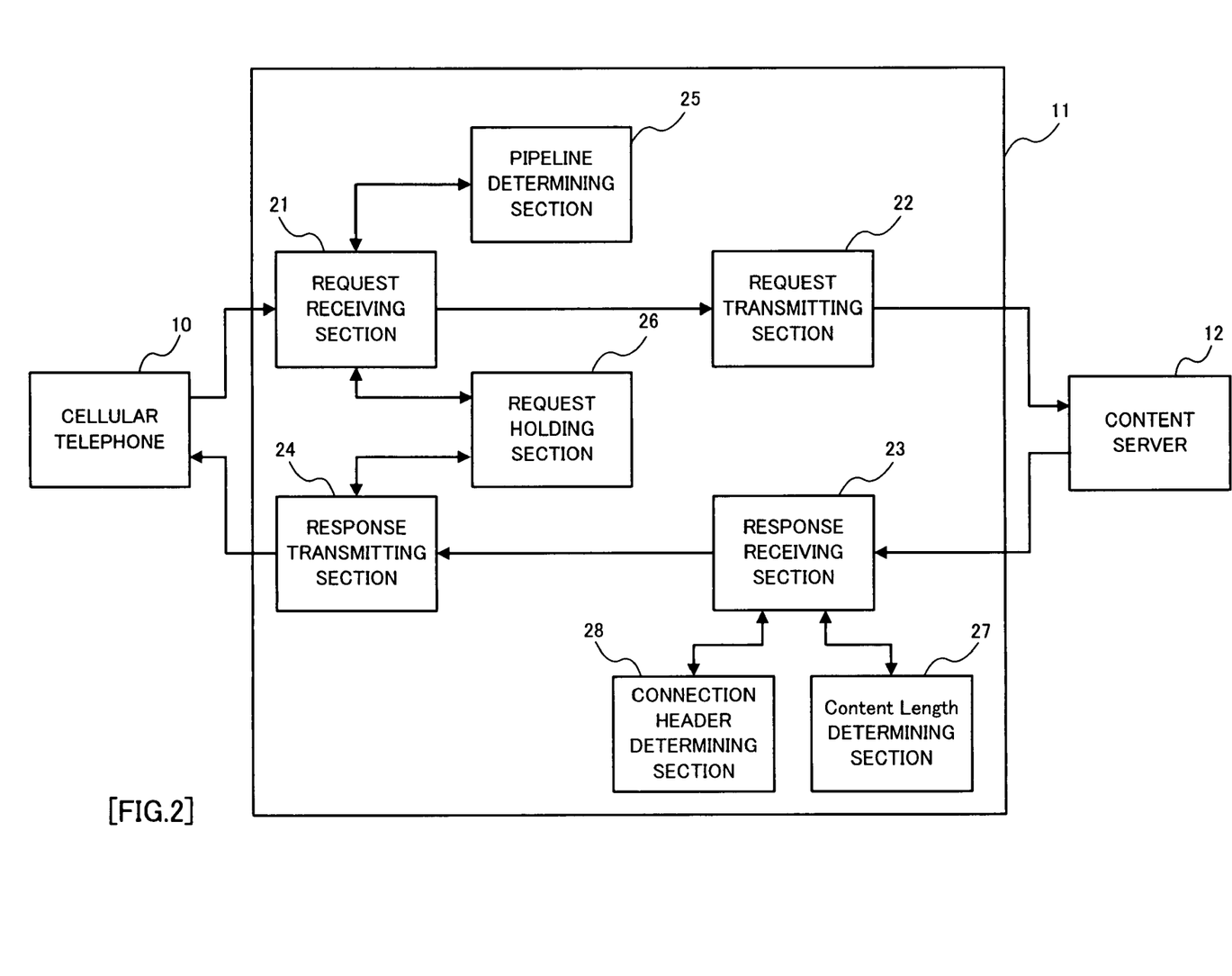
FIG. 2 is a block diagram illustrating a configuration of a mobile communication center provided in the mobile communication network system according to the embodiment.

FIG. 2 is a block diagram illustrating a configuration of the mobile communication center 11 provided in the mobile communication network system according to this embodiment. In addition, FIG. 2 particularly shows a configuration required for the mobile communication center 11 according to this embodiment to pipeline requests on the mobile communication network 13, and omits a configuration for transmitting and receiving data after pipelining the requests. Further, FIG. 2 omits the mobile communication network 13 and the Internet 14.

In the mobile communication center 11 as shown in FIG. 2, a request receiving section 21 receives a request arriving from the cellular telephone 10 via the mobile communication network 13. A request transmitting section 22 transmits the request received from the cellular telephone 10 to the content server 12 via the Internet 14. A response receiving section 23 receives an HTTP response (hereafter, simply referred to as a "response") arriving from the content server 12 via the Internet 14. A response transmitting section 24 transmits the response received from the content server 12 to the cellular telephone 10 via the mobile communication network 13.

A pipeline determining section 25 analyzes a header portion of the request received from the cellular telephone 10, determines a predetermined condition such that the cellular telephone 10 is a pipeline-compliant terminal or the like, and determines execution of pipeline processing. In addition, determination of the predetermined condition whether the telephone 10 is a pipeline-compliant terminal or the like will be described later. A request holding section 26 holds requests needed in shifting to the pipeline mode. More specifically, in the case of shifting to the pipeline mode, with a response to a request (request 1) from the cellular telephone 10 not received, the section 26 holds a subsequent request (request 2) when the request (request 2) is received.

A Content-length determining section 27 analyzes a header portion of the response received from the content server 12, and based on the analyzed result, determines whether Content-Length is unauthorized. For example, in the case that a Content-Length value is greater than data (hereinafter, referred to as "actual data" as appropriate") actually received from the content server 12, the Content-Length value is smaller than the actual data, and that Content-Length is not present, unauthorized Content-Length is determined. Then, corresponding to details of determined unauthorized Content-Length, required processing is executed. For example, the processing is performed to abandon the request held in the request holding section 26, abandon the response received from the content server 12 or the like.

A connection header determining section 28 determines descriptions of the connection header of the response received from the content server 12 in shifting to the pipeline mode. More specifically, the section 28 determines whether "close" is attached to the connection header of the response received from the content server 12, and when "close" is attached, rewrites "close" to "Keep-Alive". By thus rewriting "close" attached to the connection header to "Keep-Alive", it is intended to enable the pipeline processing on the mobile communication network 13 to be continued. In addition, when "Keep-Alive" is attached to the connection header of the response received from the content server 12, descriptions of the connection header are not rewritten.

Figure 3:
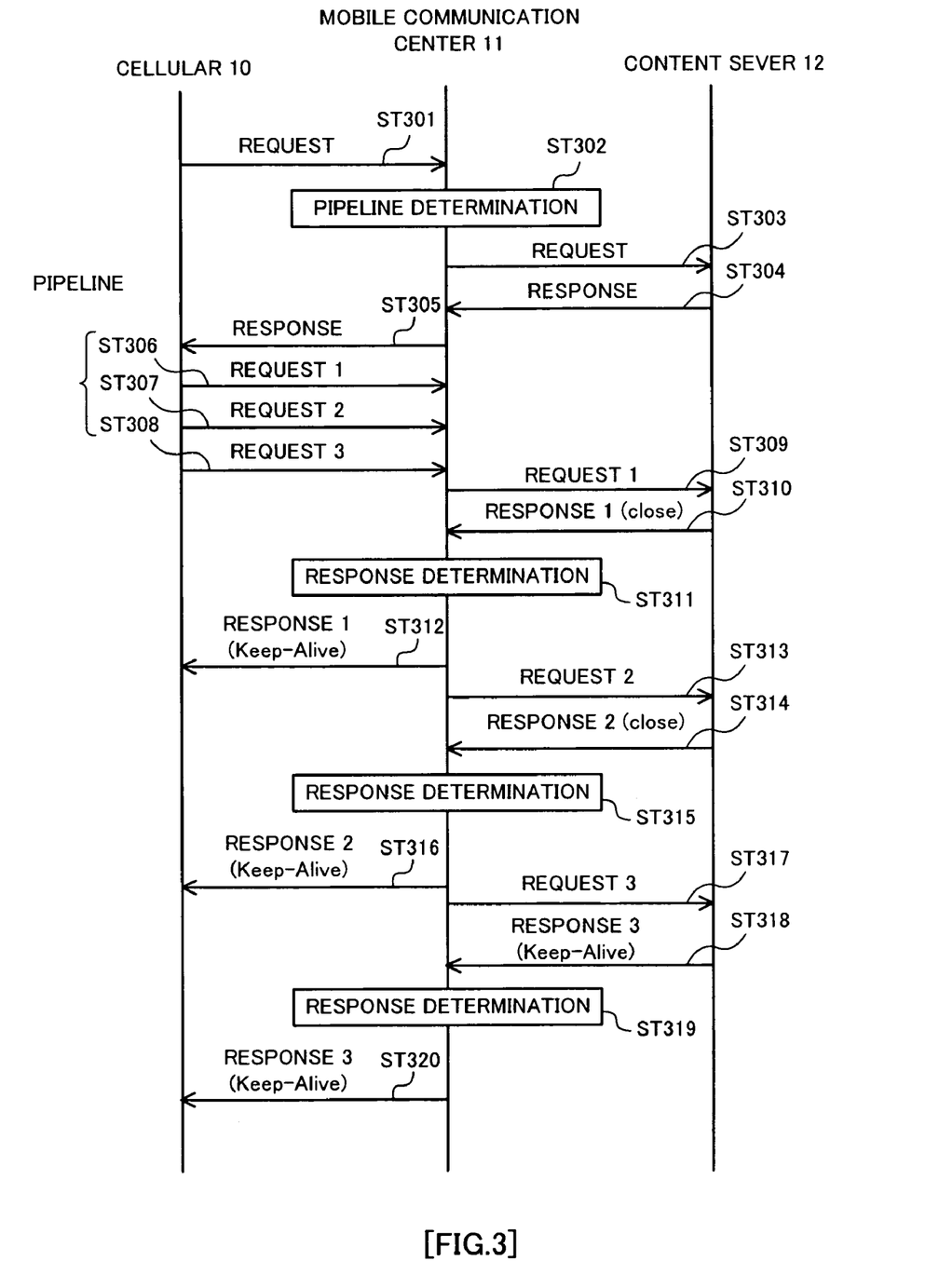
FIG. 3 is a sequence diagram to explain processing when pipeline processing is performed on the mobile communication network in the mobile communication network system according to the embodiment.

Described below is processing when the pipeline processing is performed on the mobile communication network 13 in the mobile communication network system according to this embodiment. FIG. 3 is a sequence diagram to explain the processing when the pipeline processing is performed on the mobile communication network 13 in the mobile communication network system according to this embodiment. In addition, in FIG. 3, as described above, it is assumed that the cellular telephone 10 supports HTTP/1.1 and thus supports the request pipeline, while the content server 12 supports HTTP/1.0 and does not support the request pipeline.

As shown in FIG. 3, in the mobile communication network system according to this embodiment, when the cellular telephone 10 transmits a request to the mobile communication center 11 via the mobile communication network 13 (step (hereinafter, abbreviated as "ST") 301), the mobile communication center 11 performs pipeline determination processing for determining whether or not to shift to the pipeline mode (ST302). In addition, this pipeline determination processing is performed in the pipeline determining section 25.

Figure 4:
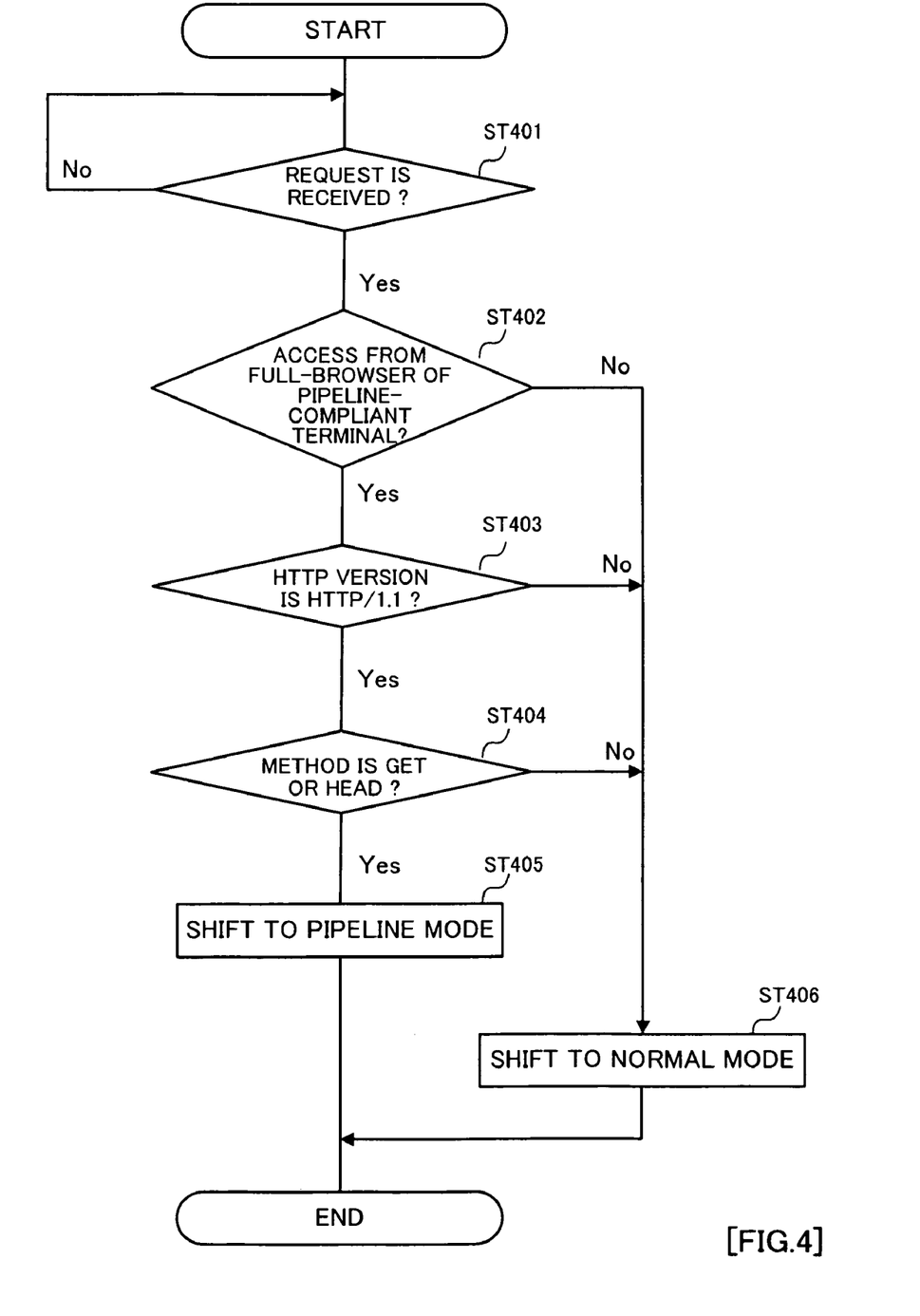
FIG. 4 is a flow diagram to explain pipeline determination processing performed in the mobile communication center of the mobile communication network system according to the embodiment.

Herein, the pipeline determination processing performed in the mobile communication center 11 is described with reference to FIG. 4. FIG. 4 is a flow diagram to explain the pipeline determination processing performed in the mobile communication center 11.

As shown in FIG. 4, the mobile communication center 11 always monitors whether a request is received from the cellular telephone 10 (ST401). Then, when the request is received, the center 11 determines whether the cellular telephone 10 is a pipeline-compliant terminal and whether the access is from a full-browser (ST402). More specifically, the pipeline-compliant terminal is determined using the model information of the cellular telephone 10 specified by UA of the request. In addition, determination on whether the telephone 10 is a pipeline-compliant terminal is not limited thereto, and may be performed based on other information (for example, serial number of the cellular telephone 10 or the like).

Then, when it is determined that the cellular telephone 10 is a pipeline-compliant terminal and accesses from a full-browser, the center 11 determines whether the HTTP version of the request is HTTP/1.1 (ST403). Further, when it is determined that the HTTP version of the request is HTTP/1.1, whether or not the method of the request is GET or HEAD is determined (ST404). Then, when it is determined that the method of the request is GET or HEAD, the operation mode of the mobile communication center 11 shifts to the pipeline mode (ST405).

In other words, in this embodiment, only in the case that UA of the request is a pipeline-compliant terminal while the access is from a full-browser (ST402), the HTTP version is HTTP/1.1 (ST403), and that the method is GET or HEAD (ST404), the mobile communication center 11 is able to shift to the pipeline mode. Thus, since the shift to the pipeline mode is determined corresponding to UA of the request from the cellular telephone 10, HTTP version and details of the method, it is possible to shift to the pipeline mode on the mobile communication network 13 only in the required case. When the mode is shifted to the pipeline mode, subsequent requests from the cellular telephone 10 are processed by the pipeline processing. In other words, the mobile communication center 11 is allowed to receive requests continuously without waiting for a response from the content server 12 in response to the request from the cellular telephone 10. After the shift to the pipeline mode is thus determined, the pipeline determination processing is finished.

In addition, in the pipeline determination processing as shown in FIG. 4, as a condition for shifting to the pipeline mode, it is determined whether or not the access is from a full-browser, but as a substitute therefor, determination may be made using the type of browser. For example, the browser to determine may be a browser for cellular telephones. Further, as a condition for shifting to the pipeline mode, it is determined whether or not the method of the request is GET or HEAD, but as a substitute therefor, it may be determined whether or not the method of the request is GET, HEAD or POST.

In addition, in the case that it is determined that the cellular telephone 10 is not a pipeline-compliant terminal or the access is not from a full-browser in ST402, it is determined that the HTTP version of the request is not HTTP/1.1 in ST403, and that it is determined that the method of the request is not GET or HEAD in ST404, the operation mode of the mobile communication center 11 shifts to the normal mode (mode for performing normal processing on a request from the cellular telephone 10) (ST406). After the shift to the normal mode is thus determined, the pipeline determination processing is finished.

Referring to FIG. 3 again, the descriptions are continued. In addition, herein, it is assumed that all the above-mentioned conditions are met in the pipeline determination processing in ST302, and that the operation mode of the mobile communication center 11 shifts to the pipeline mode. After the pipeline determination processing is performed, the mobile communication center 11 transmits the request to the content server 12 (ST303).

Upon receiving the request, the content server 12 transmits a response to the mobile communication center 11 in response to the request (ST304). Then, upon receiving the request, the mobile communication center 11 transmits the response to the cellular telephone 10 (ST305). Upon receiving the request, the cellular telephone 10 transmits a plurality of requests continuously to the mobile communication center 11 without waiting for reception of respective responses. FIG. 3 shows the case that three requests 1 to 3 are continuously transmitted to the mobile communication center 11 (ST306~ST308).

Upon receiving three requests 1 to 3, the mobile communication center 11 transmits request 1 to the content server 12 (ST309). At this point, in the mobile communication center 11, the request holding section 26 holds requests 2 and 3. Request 2 (request 3) held in the request holding section 26 is transmitted to the content server 12 when receiving response 1 (response 2) to request 1 (request 2) as described later.

Upon receiving request 1, the content server 12 transmits response 1 to request 1 to the mobile communication center 11 (ST310). In addition, it is assumed that response 1 is given "close" in the connection header. Upon receiving response 1, the mobile communication center 11 performs response determination processing for determining the descriptions (ST311). In addition, this response determination processing is performed by the Content-Length determining section 27 and connection header determining section 28.

Figure 5:
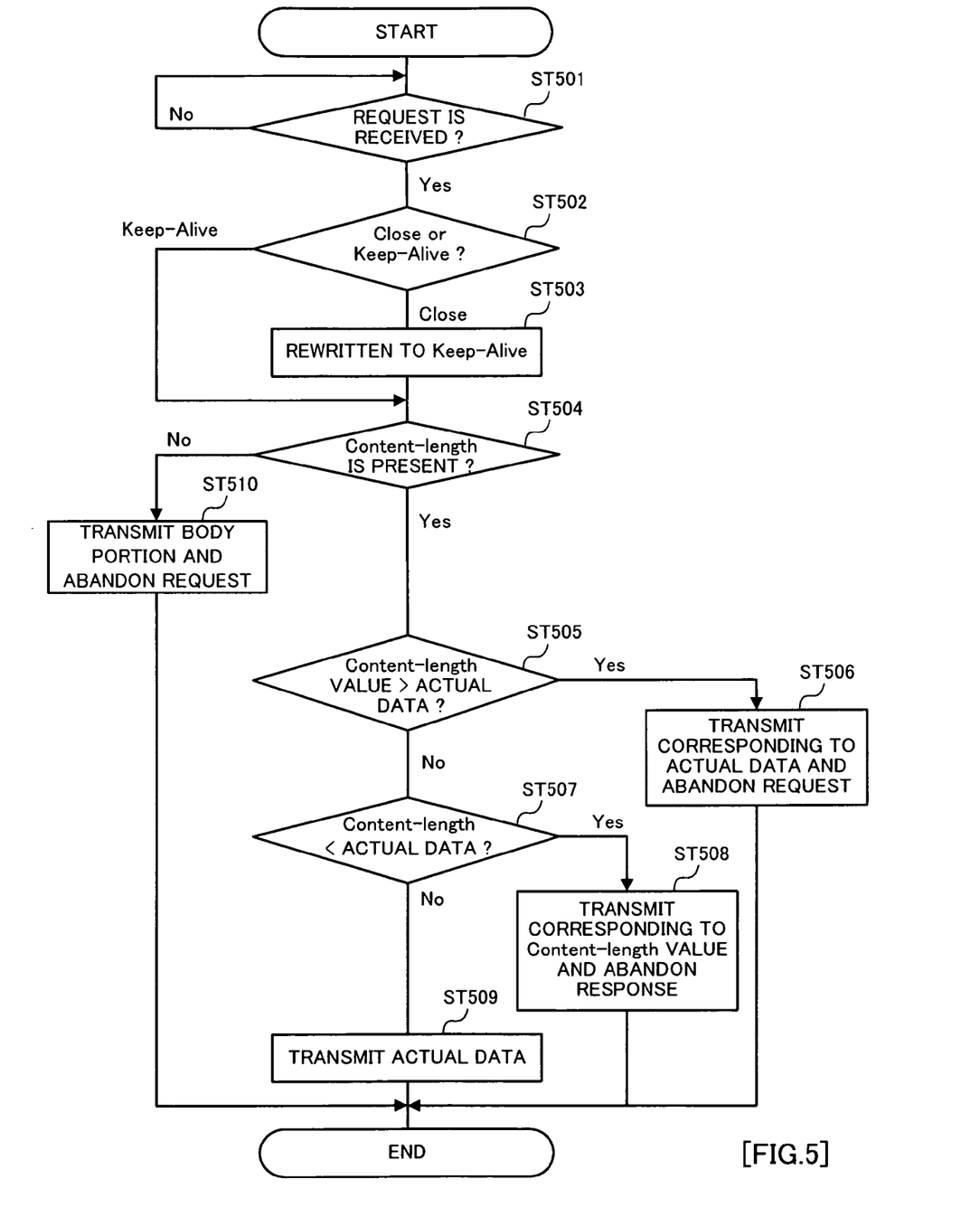
FIG. 5 is a flow diagram to explain response determination processing performed in the mobile communication center of the mobile communication network system according to the embodiment.

Herein, the response determination processing performed in the mobile communication center 11 is described with reference to FIG. 5. FIG. 5 is a flow diagram to explain the response determination processing performed in the mobile communication center 11. In addition, for convenience in description, FIG. 5 shows processing for transmitting the response to the cellular telephone 10.

As shown in FIG. 5, in the mobile communication center 11, it is always monitored whether a response is received from the content server 12 (ST501). Then, when a response is received, it is determined whether the connection header of the response is given "close" or "Keep-Alive" (ST502). Herein, when it is determined that "close" is attached to the connection header, "close" is rewritten to "Keep-Alive" (ST503), and the processing flow shifts to ST504. Meanwhile, when it is determined that "Keep-Alive" is attached to the connection header, rewriting is not performed, and the processing flow shifts to ST504 without change.

Ordinarily, in a response transmitted from the content server 12, "close" is attached to the connection header of the response. However, when the response with "close" attached to the connection header is transmitted to the cellular telephone 10 without change, connection between the mobile communication center 11 and cellular telephone 10 is disconnected. Therefore, the mobile communication center 11 according to this embodiment rewrites "close" attached to the connection header of the response to "Keep-Alive", and thereby prevents communication between the cellular telephone 10 and content server 12 from being disconnected.

After descriptions of the connection header is rewritten to "Keep-Alive" in ST503, or after descriptions of the connection header are kept at "Keep-Alive" in ST502, the mobile communication center 11 determines whether Content-Length is present (ST504). Determining whether Content-Length is present is to determine fraud that Content-Length is not present. In addition, the flow as shown in FIG. 5 shows the case that Content-Length is determined after rewriting "close" attached to the connection header of the response, but the processing order is not limited thereto, and is capable of being modified as appropriate.

When it is determined that Content-Length is present, whether a Content-Length value is greater than actual data is determined (ST505). Herein, when it is determined that the Content-Length value is greater than actual data, after data corresponding to the actual data is transmitted to the cellular telephone 10, TCP connection is temporarily disconnected between the cellular telephone 10 and mobile communication center 11, and between the mobile communication center 11 and content server 12, and a request is abandoned in the case that the request is left in the request holding section 26 (ST506). Thus, when the Content-Length value is greater than actual data, the request from the cellular telephone 10 is abandoned as required, and such matters are thereby prevented that subsequent pipeline processing is limited due to the request remaining. By performing the processing, the response determination processing is finished.

When it is determined that the Content-Length value is not greater than actual data, whether the Content-Length value is smaller than the actual data is determined (ST507). Herein, when it is determined that the Content-Length value is smaller than the actual data, data corresponding to the Content-Length value is transmitted to the cellular telephone 10. Thereafter, when a remaining response is received, the response is abandoned (ST508). Thus, when the Content-Length value is smaller than the actual data, since the response from the content server 12 is abandoned as necessary, it is possible to prevent matters that subsequent pipeline processing is limited due to the response remaining. After performing the processing, the response determination processing is finished.

In addition, when it is determined that the Content-Length value is not smaller than the actual data in ST507, the Content-Length value and actual data is judged to be the same, and the actual data is transmitted to the cellular telephone 10 (ST509). Thereafter, the response determination processing is finished.

Further, when it is determined that Content-Length is not present in ST504, after a BODY portion is transmitted to the cellular telephone 10, TCP connection is temporarily disconnected between the cellular telephone 10 and mobile communication center 11, and between the mobile communication center 11 and content server 12, and a request is abandoned in the case that the request is left in the request holding section 26 (ST510). Thus, when Content-Length value is not present, the request from the cellular telephone 10 is abandoned as required, and such matters are thereby prevented that subsequent pipeline processing is limited due to the request remaining. By performing the processing, the response determination processing is finished.

In addition, in ST506 and ST510 as described above, when TCP connection is temporarily disconnected between the cellular telephone 10 and mobile communication center 11, and between the mobile communication center 11 and content server 12, it is configured that the cellular telephone 10 retransmits a request to the mobile communication center 11 (not shown in FIG. 3). In this case, when TCP connection is disconnected during the time of receiving a response from the mobile communication center 11, the telephone 10 retransmits all the requests waiting for responses by the pipeline processing. In addition, a request to the response in which TCP connection is disconnected is not a subject of retransmission. However, when the response is not received and requests are retransmitted, the beginning request of the pipeline processing is a subject of retransmission.

Thus, in the mobile communication network system according to this embodiment, when fraud arises in Content-Length, the request from the cellular telephone 10 or the response from the content server 12 is abandoned as appropriate in ST506, ST508 and ST510, and it is thereby intended to normally receive re-request arriving from the mobile apparatus.

Referring to FIG. 3 again, the descriptions are continued. Herein, it is assumed in the response determination processing in ST311 that "close" attached to the connection header is rewritten to "Keep-Alive" in ST503, and that the Content-Length value and actual data are determined to be the same.

After performing the response determination processing, the mobile communication center 11 transmits response 1 to the cellular telephone 10 (ST312). In this case, response 1 is provided in its connection header with "Keep-Alive".

When response 1 is transmitted to the cellular telephone 10, the mobile communication center 11 subsequently transmits request 2 to the content server 12 (ST313). Upon receiving request 2, the content server 12 transmits response 2 to request 2 to the mobile communication center 11 (ST314). In addition, it is assumed that response 2 is provided in its connection header with "close".

Upon receiving response 2, the mobile communication center 11 performs the response determination processing (ST315) in the manner as described above (ST315). Herein, in the response determination processing in ST315, as in ST311, it is assumed that "close" attached to the connection header is rewritten to "Keep-Alive" in ST503, and that the Content-Length value and actual data are determined to be the same. After performing the response determination processing, the mobile communication center 11 transmits response 1 to the cellular telephone 10 (ST316). In this case, response 2 is provided in its connection header with "Keep-Alive".

When response 2 is transmitted to the cellular telephone 10, the mobile communication center 11 subsequently transmits request 3 to the content server 12 (ST317). Upon receiving request 3, the content server 12 transmits response 3 to request 3 to the mobile communication center 11 (ST318). In addition, it is assumed that response 3 is provided in its connection header with "Keep-Alive".

Upon receiving response 3, the mobile communication center 11 performs the response determination processing in the manner as described above (ST319). Herein, in the response determination processing in ST319, as distinct from ST311 and ST315, it is assumed that ""Keep-Alive" attached to the connection header is not rewritten and maintained, and that the Content-Length value and actual data are determined to be the same. After performing the response determination processing, the mobile communication center 11 transmits response 3 to the cellular telephone 10 (ST320). In this case, response 3 is provided in its connection header with "Keep-Alive".

Thus, the cellular telephone 10 sequentially receives responses transmitted from the mobile communication center 11 to display on the display screen, thereby enabling the content distributed from the content server 12 to be viewed in the cellular telephone 10. In this way, in the mobile communication network system according to this embodiment, a series of processing is completed in the case that the pipeline processing is performed on the mobile communication network 13.

Thus, according to the mobile communication network system according to this embodiment, when a request received from the cellular telephone 10 meets predetermined conditions, since the mobile communication center 11 executes the pipeline processing for enabling requests from the cellular telephone 10 to be continuously received, such matters are prevented that the communication time undergoes the effect of communication status on the mobile communication network 13 and increases as a result of repeating the request and response on the mobile communication network 13, and it is thereby possible to adequately reduce the time for the cellular telephone 10 to acquire the content.

Particularly, in the mobile communication network system according to this embodiment is further provided the content server 12 that distributes the content to the cellular telephone 10 via the mobile communication center 11, where the mobile communication center 11 sequentially transmits requests continuously received from the cellular telephone 10 in the pipeline mode to the content server 12, while receiving responses to the requests from the content server 12. In this case, also when the content server 12 distributes the content to the cellular telephone 10 via the mobile communication center 11, such matters are prevented that the communication time undergoes the effect of communication status on the mobile communication network 13 and increases as a result of repeating the request and response on the mobile communication network 13, and it is thereby possible to adequately reduce the time for the cellular telephone 10 to acquire the content.

Further, in the mobile communication network system according to this embodiment, when the mobile communication center 11 detects unauthorized Content-length in the response from the content server 12, the center 11 abandons the request from the cellular telephone 10 or response from the content server 12 as required to continue the pipeline processing. Thus, even in the case of detecting unauthorized Content-length in the response from the content server 12, since the request from the cellular telephone 10 or response from the content server 12 is abandoned as required to continue the pipeline processing, it is possible to reduce the time for the cellular telephone 10 to acquire the content, while preventing matters that communications between the cellular telephone 10 and the content server 12 are disconnected in response to unauthorized Content-length.

In addition, the invention is not limited to the above-mentioned embodiment, and is capable of being carried into practice with various modifications thereof within the scope of producing the effects of the invention. Further, without departing from the scope of the object of the invention, the invention is capable of being modified as appropriate to be carried into practice.

For example, the above-mentioned embodiment describes the case where the cellular telephone 10 receives the content (content to display a Web site created for personal computers) distributed from the content server 12 via the mobile communication center 11, but the content received in the cellular telephone 10 is not limited thereto, and is capable of being modified as appropriate. For example, the invention is applicable to the case of receiving content to display a Web site created for the cellular telephone 10 from the mobile communication center 11. Also in this case, such matters are prevented that the communication time undergoes the effect of communication status on the mobile communication network 13 and increases as a result of repeating the request and response on the mobile communication network 13, and it is thereby possible to adequately reduce the time for the cellular telephone 10 to acquire the content.

As described above, the mobile communication network system and server apparatus according to the invention execute the pipeline processing for enabling HTTP requests from the mobile terminal apparatus to be continuously received when the request for Web access from the mobile terminal apparatus meets predetermined conditions, sufficiently reduce the time for the mobile terminal apparatus to acquire the content, and have industrial applicability.

The invention claimed is:

1. A mobile communication network system comprising:
a mobile terminal apparatus having a browser function;
a server apparatus operable to manage mobile communication in the mobile terminal apparatus via a mobile communication network and, upon receiving a HTTP request from the mobile terminal apparatus, determine whether the HTTP request meets a predetermined condition, and when the HTTP request meets the predetermined condition, it executes pipeline processing for enabling HTTP requests from the mobile terminal apparatus to be continuously received; and
a content distribution apparatus operable to distribute content to the mobile terminal apparatus via the server apparatus, the content distribution apparatus including a memory;
wherein the server apparatus determines execution of the pipeline processing corresponding to a version of the HTTP request and details of a method of the HTTP request,
wherein the server apparatus is also operable to sequentially transmit HTTP requests continuously received in the pipeline processing to the content distribution apparatus, while receiving HTTP responses to the HTTP requests from the content distribution apparatus, and
wherein when a connection header of the HTTP response from the content distribution apparatus is given close, the server apparatus rewrites descriptions of the connection header to Keep-Alive to continue the pipeline processing.

2. The mobile communication network system according to claim 1, wherein the server apparatus executes the pipeline processing in the case of the version of the HTTP request being HTTP/1.1 and the method of the HTTP request being a predetermined method.

3. The mobile communication network system according to claim 2, wherein the server apparatus executes the pipeline processing in the case of the mobile terminal apparatus supporting the pipeline processing.

4. The mobile communication network system according to claim 3, wherein the server apparatus executes the pipeline processing when access is from the browser function of the mobile terminal apparatus.

5. The mobile communication network system according to claim 4, wherein browser function is a full-browser.

6. The mobile communication network system according to claim 3, wherein the server apparatus executes the pipeline processing when the method of the HTTP request is GET or HEAD.

7. The mobile communication network system according to claim 3, wherein the server apparatus executes the pipeline processing when the method of the HTTP request is GET, HEAD or POST.

8. The mobile communication network system according to claim 1, wherein when the server apparatus detects an unauthorized Content-length in an HTTP response from the content distribution apparatus, the server apparatus abandons an HTTP request from the mobile terminal apparatus or the HTTP response from the content distribution apparatus as necessary to continue the pipeline processing.

9. The mobile communication network system according to claim 8, wherein when a Content-length value in the HTTP response from the content distribution apparatus is greater than data actually transmitted from the content distribution apparatus, the server apparatus abandons the HTTP request from the mobile terminal apparatus as necessary.

10. The mobile communication network system according to claim 8, wherein when a Content-length value in the HTTP response from the content distribution apparatus is smaller than data actually transmitted from the content distribution apparatus, the server apparatus abandons the HTTP response from the content distribution apparatus as necessary.

11. The mobile communication network system according to claim 8, wherein when a Content-length header is not present in the HTTP response from the content distribution apparatus, the server apparatus abandons the HTTP request from the mobile terminal apparatus as necessary.

12. A server apparatus that manages mobile communication in a mobile terminal apparatus via a mobile communication network and distributes content from a content distribution apparatus to the mobile terminal apparatus, comprising:

a request receiving section operable to receive a HTTP request from the mobile terminal apparatus;

a pipeline determining section operable to determine whether the HTTP request received in the request receiving section meets a predetermined condition, and when the HTTP request meets the predetermined condition, allows execution of pipeline processing for enabling HTTP requests from the mobile terminal apparatus to be continuously received;

a request holding section operable to hold HTTP requests continuously received from the mobile terminal apparatus in the pipeline processing;

a response transmitting section operable to transmit a HTTP response to the mobile terminal apparatus;

a request transmitting section operable to transmit a HTTP request from the mobile terminal apparatus to the content distribution apparatus;

a response receiving section operable to receive a HTTP response from the content distribution apparatus, the content distribution apparatus including a memory; and a connection header determining section operable to determine a connection header of Content-length in a HTTP response received in the response receiving section;

wherein the pipeline determining section determines execution of the pipeline processing corresponding to a version of the HTTP request and details of a method of the HTTP request, and wherein when the connection header of the HTTP response is given close, the connection header determining section rewrites descriptions of the connection header to Keep-Alive to continue the pipeline processing.

13. The server apparatus according to claim 12, wherein the pipeline determining section determines execution of the pipeline processing in the case of the version of the HTTP request being HTTP/1.1 and the method of the HTTP request being a predetermined method.

14. The server apparatus according to claim 13, wherein the pipeline determining section determines execution of the pipeline processing in the case of the mobile terminal apparatus supporting the pipeline processing.

15. The server apparatus according to claim 14, wherein the pipeline determining section determines execution of the pipeline processing when access is from the browser function of the mobile terminal apparatus.

16. The server apparatus according to claim 15, wherein browser function is a full-browser.

17. The server apparatus according to claim 14, wherein the pipeline determining section determines execution of the pipeline processing when the method of the HTTP request is GET or HEAD.

18. The server apparatus according to claim 14, wherein the pipeline determining section determines execution of the pipeline processing when the method of the HTTP request is GET, HEAD or POST.

19. The server apparatus according to claim 12, further comprising:

a Content-length determining section operable to determine an unauthorized Content-length in an HTTP response received in the response receiving section;

wherein when the Content-length determining section detects an unauthorized Content-length, the Content-length determining section abandons the HTTP request from the mobile terminal apparatus or the HTTP response from the content distribution apparatus as necessary to continue the pipeline processing.

20. The server apparatus according to claim 19, wherein when a Content-length value in the HTTP response from the content distribution apparatus is greater than data actually transmitted from the content distribution apparatus, the Content-length determining section abandons the HTTP request from the mobile terminal apparatus as necessary.

21. The server apparatus according to claim 19, wherein when a Content-length value in the HTTP response from the content distribution apparatus is smaller than data actually transmitted from the content distribution apparatus, the Content-length determining section abandons the HTTP response from the content distribution apparatus as necessary.

22. The server apparatus according to claim 19, wherein when a Content-length header is not present in the HTTP response from the content distribution apparatus, the Content-length determining section abandons the HTTP request from the mobile terminal apparatus as necessary.

\* \* \* \* \*